March 11, 1969

A. GODEL

3,431,892

PROCESS AND APPARATUS FOR COMBUSTION AND
HEAT RECOVERY IN FLUIDIZED BEDS
Filed Aug. 2, 1967

INVENTOR
ALBERT GODEL
BY Richards & Geier
ATTORNEYS

United States Patent Office 3,431,892
Patented Mar. 11, 1969

3,431,892
PROCESS AND APPARATUS FOR COMBUSTION AND HEAT RECOVERY IN FLUIDIZED BEDS
Albert Godel, Paris, France, assignor to Compagnie Industrielle de Procédés & d'Applications S.A. (CIPA), Neuchatel, Switzerland, a corporation of Switzerland
Filed Aug. 2, 1967, Ser. No. 661,752
Claims priority, application France, Feb. 17, 1967, 95,369
U.S. Cl. 122—4
Int. Cl. F22d 13/00
10 Claims

ABSTRACT OF THE DISCLOSURE

A process which may be used in conjunction with a steam generator for the combustion of smalls and recovery of heat wherein combustion takes place successively in a primary furnace and in a secondary furnace of postcombustion. In the primary furnace at least a portion of the smalls is combusted at a sufficiently high temperature to cluster the ash into clinkers or slag which can thus be separated from the coal and removed. The secondary furnace receives smalls directly or through gas flow carryover of ash-like carbon particles; it contains at least one fluidized layer of granulated refractory substances. Heat exchange surfaces of the steam generator are located in the fluidized layer to maintain a temperature which is sufficiently low to avoid scorification but which is sufficient for the combustion of particles supplied by the gas flow. Noncombusted residue is returned to the primary furnace for scorification and removal in the form of clinkers or slag.

---

This invention relates to a process for combusting smalls of coal or other fuel with recovery of effective heat and latent heat contained in the gases and flue dust of particles of carbonized ashes. This invention also relates to an apparatus which generates steam by utilizing this process of combustion and heat recovery.

In prior art solid fuel was burned in high temperature furnaces which produce flue dust consisting of fine carbonized ash-like particles and which provide besides, the evacuation of fuel ashes in the form of clinkers which are more or less free of carbon.

Furnaces of this type include pulverizing furnaces with fusion of ashes, or furnaces with a fluidized bed of granular combustible substances producing the extraction of ashes in the form of clinkers, as described in French Patent No. 1,092,540, or spreader stokers with extraction of ashes in the form of clinkers and various types of fusion furnaces used in chemical, mechanical and metallurgical industries.

The drawbacks of all these furnaces is that they must be constructed of substantially large size to limit the carry-over of flue dust which may be reinjected into the furnace and, besides, large heat exchange surfaces must be provided to obtain sufficient recovery of calories contained in the gas.

On the other hand, it is also known in prior art to produce in the fluidized layers of inert granular refractory substances a combustion at a low temperature of pulverulent combustible substances or of granules carried by the air of fluidization. However, these processes of combustion at a low temperature in a fluidized bed so far have not been applied industrially to any extent, primarily for the reason that it has not possible to reinject the ash-like flue dust into the combustion circuit without is being blocked by pulverulent ashes which can not be eliminated.

An object of the present invention is to avoid the drawbacks of prior art processes and apparatus.

Other objects of the present invention will become apparent in the course of the following specification.

In accomplishing these objectives the present invention provide a process of fuel combustion wherein combustion takes place successively in two furnaces one of which may be described as a "primary furnace" while the other may be described as a "secondary furnace of postcombustion." The primary furnace produces a combustion at a sufficiently high temperature of at least a part of the fuel smalls which have been produced so as to make possible separation and evacuation of the corresponding ashes in the form of clinkers or slag. The secondary furnace produces at low temperature the combustion of the fuel smalls and of ash-like particles carried in an ascending circulation by combustion gases. It includes at least one layer of incombustible solid refractory granulated substances in a fluidized state. Heat exchanging surfaces of the steam generator are located in this layer or this layer is incorporated in these surfaces. These surfaces assure that a sufficiently low temperature is maintained to avoid all scorification of flue dust of combustible ash-like particles; the temperature is sufficient, however, to proceed with the combustion of these particles carried by the gases. At least a part of the residue of ash-like flue dust which has escaped is then reinjected after having been separated from the gases into the primary furnace for the purposes of scorification and removal in the form of clinkers or slag.

Thus the present invention provides a novel combination in the same gas circuit of a primary combustion furnace at high temperature which receives all or a part of the combustible substances, with a secondary postcombustion furnace with a fluidized layer at a low temperature. This combination has many new advantages.

The term "primary furnace" is used herein to describe a furnace burning combustible substances at a temperature which is higher than that of the softening of ashes, thus permitting the separation and extraction of ashes in the form of clinkers or slag.

The term "secondary furnace of postcombustion" is used herein to describe a furnace providing in one or more phases the combustion of combustible smalls and of ash-like carbonized particles at a temperature which is sufficiently low to avoid all scorification but which is sufficiently high to effectively subject to combustion particles entrained by the combustion gases of the primary furnace.

The secondary postcombustion furnace provides at the same time the postcombustion in fluidized phase of particles fed-in directly or entrained by the combustion gases of the primary furnace and an effective and latent heat recovery of these gases in a fluidized phase. It includes one or several layers of incombustible granulated substances in which are incorporated calorific exchange surfaces which make possible the temperature control and also permit to carry out of the reheating, the vaporization and eventually the superheating of water from the generator, as well as the reheating of the air of combustion.

The larger part of carbon contained in the ash-like carbonized flue dust is burned up upon leaving the secondary furnace of postcombustion with the flue gas but it is desirable to be able to recover the effective heat of the outgoing gases. This may be attained in accordance with the present invention by providing heat exchangers in the gaseous flow which are characterized in that this gaseous flow is caused to pass through one or several layers of granulated incombustible fluidized substances in which are incorporated surfaces of calorific exchange. The flue dust which was enriched by ashes due to postcombustion, which was entrained by combustion gases and which leaves the secondary furnace, passes through the heat exchangers with fluidized layers, the temperature of which is maintained below the burning temperature of flue dust. If several successive fluidized layers are used in the exchangers, their temperature is regulated according to the present invention in such manner that it will decrease in the direction of the circulation of the gases, the temperature of the last fluidized layer corresponding to the lowermost temperature suitable for the economic recovery of calories contained in the gas.

After having left the secondary furnace of postcombustion and after having eventually passed through the above described heat exchange zone, the gases and the flue dust enriched with ashes pass into a dust removing device wherein their separation takes place. The collected flue dust is partially or in its entirety sent back to the primary furnace where it is subjected eventually to new combustion processes. The pure ash fraction of the reinjected flue dust is then transformed by fusion into slag or clinkers which are evacuated with the slag or clinkers produced by the combustion of the feed smalls of the primary furnace.

The incombustible granulated substance used for the formation of fluidized layers utilized in the secondary furnace of postcombustion and eventually in the above described heat exchangers, consists according to the present invention, of solid refractory particles the floating capacity of which in the fluidized bed is effectively smaller than that of the combustible flue dust which passes through them. They can be also prepared from the ashes derived from the combustible substance itself. Furthermore, they can consist of incombustible refractory substances capable of absorbing or neutralizing undesirable chemical substances contained in the combustion gases. Thus, for example, by a proper choice of the substances constituting the fluidized layers it is possible to eliminate, on the one hand, combustion gases polluting the atmosphere, such as sulphurous or sulphuric acids or nitric oxides, and on the other hand, to eliminate substances detrimental to the maintenance of calorific exchange surfaces of the boiler, such as vanadium oxide.

The present invention makes it possible to provide a generator of steam or hot water which is characterized by the use of two furnaces located one above the other or side by side, namely, a primary furnace which vaporizes a fraction of the water of the boiler, assuring the combustion at high temperature of the combustible smalls and the evacuation of ashes having the form of clinkers, and a secondary furnace which reheats and vaporizes an additional portion of the boiler water by the postcombustion at a low temperature of particles of carbonized ashes entrained by the gases and the recovery of the effective gas heat due to the surfaces of calorific heat exchange incorporated in the fluidized layers.

The invention will appear more clearly from the following detailed description when taken in connection with the accompanying drawing, showing by way of example, a preferred embodiment of the inventive idea.

The illustrated steam generator includes the so-called primary furnace 54 pressurized at a high temperature; it is provided with a sloping grate 55 and a fluidized layer 56 of the type described in the above-mentioned French Patent No. 1,092,540. Solid granulated fuel is supplied at 57. Clinkers resulting from the combustion of said fuel in fluidized condition are removed at 72. Primary air is sent into the sloping fluidization grate at 58. Secondary air is introduced into the furnace at 59 and 60 until a substantial excess of air is produced. Fumes free of dust which are recovered at the stack by a suitable device (not shown), can be mixed with air injected at 60 in order to reduce and to regulate the temperature of combustion gases in the upper part of the primary furnace before they pass through the supporting grate 61.

Figure 1:
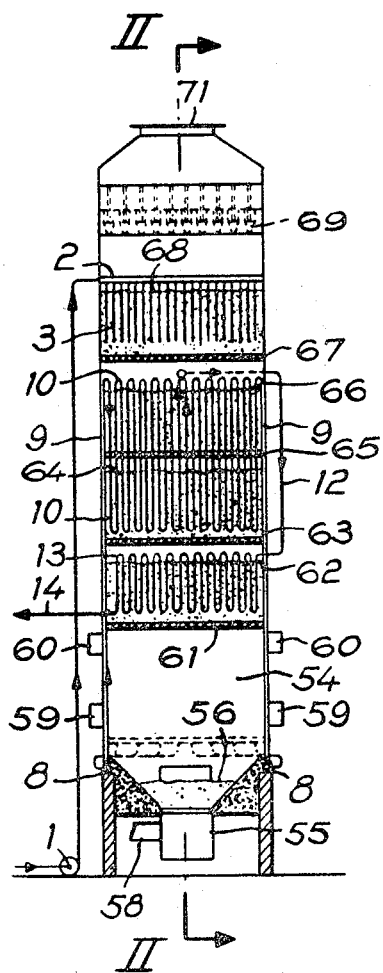
FIGURE 1 is a section along the line I—I of FIG. 2 of a steam generator constructed in accordance with the present invention.
Figure 2:
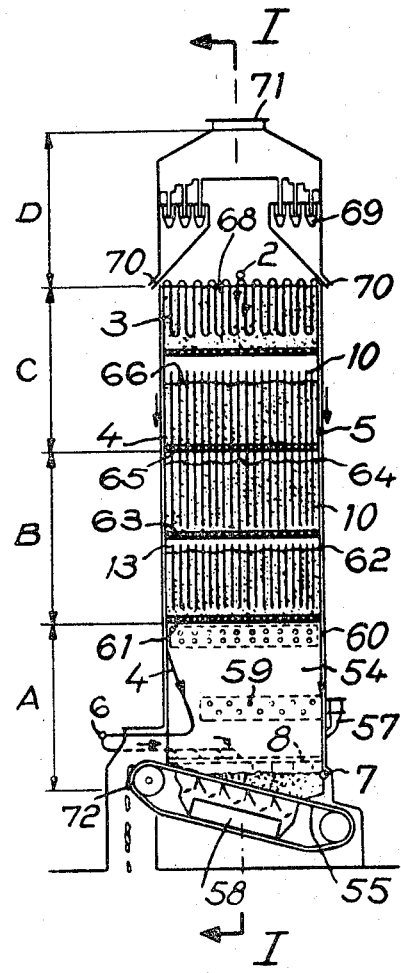
FIGURE 2 is a section along the line II—II of FIG. 1.

The primary furnace extends to the level indicated at A in FIG. 2 and is surmounted by a so-called secondary furnace of postcombustion. This postcombustion is operated in a fluidized bed of inert granulated material, as described in detail hereinafter, which occupies the section B and into which additional granulated fuel and/or air may be injected. Over the secondary furnace is a device for the recovery of effective heat in the section C and then a dust removing device in the section D.

The combustion gases from which dust has been removed are recirculated at 60. The temperature of the fluidized layer 62 is maintained by the heat exchange surfaces 13 of a superheater of steam which has the shape of tubes bent in the form of an accordion; the temperature is below that of the melting point of ashes. However, the temperature is sufficiently high to maintain in ignition the granulated particles which may be directly incorporated into the layer 62 and the ash-like carbonized particles entrained by the oxidizing gases passing through the grate 61. A second grate 63 and a third grate 65 support fluidized layers 64 and 66 respectively, in which are incorporated vaporization tubes 10 of the generator. These tubes are also bent in the shape of an accordion and pass through the grate 65.

Gases resulting from combustion in the primary furnace as well as in that of postcombustion, issue from the layer 66 and pass through the grate 67 supporting the fluidized layer 68 in which are incorporated tubes 3 bent in the shape of an accordion and constituting a reheater of the water feed of the boiler.

It is apparent from the above description that all the fluidized layers of the secondary furnace and of the heat recovering device are formed by granulated incombustible substances containing a small proportion of granulated combustible substances; these latter are constituted by carbonized ash-like flue dust which passes upwardly through the layers.

Gases evacuated from the layer 68 pass through the dust-removing device 69 before escaping into the stack 71. Flue dust, consisting in the major part of ashes, is collected at 70 in order to be reintroduced along with the fuel supplied to the primary furnace at 57.

Since neither the method of injecting the coal into the primary or secondary furnace, nor the water circuit through the reheating tubes, vaporization tubes and the superheating tubes of the boiler, which is of the type providing forced circulation, constitute characteristic features of the present invention, they are mentioned hereinafter merely by way of example. The direction of flow in the tubes is indicated by arrows in the drawing. However, the drawing does not show the additional by-passes for varying the volume of circulating water as is customary in boilers having forced circulation.

Water delivered by the pump 1 is distributed by the channel 2 to the tubes 3 bent in the shape of an accordion and incorporated in the fluidized layer 68 of incombustible granulated substances. Reheated water then flows downwardly through the front tubes 4 and 5 which extend to the bottom of the boiler bordering upon collectors 6, 7 and 8. These tubes constitute in their entirety the end elements of the radiant heat exchange of the zone A of the generator. Said collectors supply the tubes of the radiant end elements 9 of the two other surfaces of the boiler wherein water circulates downwardly to supply vaporizing tubes 10. These vaporizing tubes bent in the shape of an accordion, are arranged in parallel rows incorporated in the two fluidized layers 64 and 66 of granulated incombustible substances. The produced steam circulates downwardly through the outer tubes 12 to the reheating tubes 13 bent in the shape of an accordion and arranged in parallel vertical rows incorporated in the fluidized layer 62 of incombustible granulated substances. The superheated steam is finally delivered at 14.

Without exceeding the scope of the present invention, the above described use of superheating tubes or vaporization tubes bent in the shape of an accordion and arranged in parallel vertical rows incorporated in one or more fluidized layers of incombustible granulated substances, can be replaced by superheating tubes or vaporization tubes bent as spirals in horizontal superposed planes incorporated in one or more fluidized layers of incombustible refractory granulated substances.

Furthermore, without exceeding the scope of the present invention, the use of the above described several superposed fluidized layers with a different temperature for each layer which drops in the direction of flow of gases, may be replaced by a single fluidized layer the temperature of which decreases progressively at each level in the direction of flow of gases. This can be attained, for example, by disposing within the fluidized layer, following a known procedure, non-fluidizable incombustible filling bodies, such as balls, Raschig rings, etc.

The above described steam generator operates as follows:

Smalls of bituminous coal with granules of a size from extremely small ones up to 20 mm. are supplied to the furnace 54. In the selected example the ash content of the carbon is 10% and the ashes begin to melt at 1075° C. Fractions having a higher grading, for example, those between 2 and 20 mm., burn in the fluidized layer 56 by the action of primary air passed into the grate 58. Thus the layer 56 is primarily constituted by incandescent coke. On the other hand, carbon fractions of smaller grading are also transformed into coke and burn while flying with the combustion gases which are rendered oxidizing by the injection of secondary air coming from 59 and 60. The supply of the combustible substance and air is controlled automatically, depending upon the demand for steam according to well known methods.

Different means including essentially the choice of the grading of the carbon particles and the speed of ascension of gases in the combustion chamber, provide a substantial increase in the proportion of flue dust in the combustion chamber 54; in the selected example it amounts to 30% by weight of the carbon supplied to the primary furnace, which amount in the above example is sufficient to maintain combustion in the layer 64.

A fraction of water of the generator is vaporized under the action of the intense calorific transmission at the radiant end elements 4 and 5, as well as 9.

Combustion gases pass successively through the supporting grate 61 and fluidized layers 62 and 64 maintained at predetermined fixed temperatures which in the present example amount to 900° C. and 700° C., respectively, by the heat exchange surfaces 13 and 10. The surfaces 13 are those of the superheater, the surfaces 10 are those of the vaporizing tubes. Postcombustion is thus assured at 62 and 64 at the predetermined low above-mentioned temperatures of 900° C. and 700° C.

It should be noted tha the low temperature of 700° C. prevails in the second layer 64. The balance of C—CO—$CO_2$ is entirely in favor of $CO_2$ even in an atmosphere containing only a very small excess of oxygen; this avoids the presence of lost carbon monoxide in the gases while permitting a quasi stoichiochemical combustion. As far as the residuary effective heat of the combustion gases is concerned which issues from the layer 64, it is transferred to tubular vaporization surfaces 10 which extend through the fluidized layer 66.

In the selected example the predetermined temperature of the layer 66 is 350° C.

The combustion gases emerging with a temperature of 350° C. deliver their residual effective heat at the end of the flow to the tubes 3 of the reheater of the supply water which is incorporated in the fluidized layer 68, the predetermined temperature of which is fixed at 220° C. Gases leave it with a temperature of about 220° C. and are evacuated to the stack 71 after dust removal at 69. The entire flue dust containing residual carbon but consisting principally of fly ashes, is collected at 70 and is reinjected into the furnace 54 which provides its fusion and evacuation in the form of clinkers.

It should be noted that the present invention does not reside in any special form of primary furnace operating at a high temperature, nor in the used type of generator of steam. In fact, it is easy to conceive that the primary furnace described in the above example can be replaced within the scope of the present invention by a primary pulverizing furnace of the ash fusion type or a spreader stoker furnace providing extraction of ashes in the form of clinkers, or various types of spreaders.

Furthermore, the present invention is not concerned with any specific form of secondary furnace characterized by the post-combustion and the recovery of effective gas heat by the use of at least one layer of granulated refractory fluidized substances in which surfaces of calorific heat exchange are integrated, nor with any specific form or arrangement of the heat exchange surfaces.

There are the following numerous advantages resulting from the present invention:

Flue dust consisting of carbonized ash-like particles which is often an inconvenience in the high temperature furnaces of prior art, is utilized in accordance with the present invention and if its proportion is insufficient, it can even be increased artificially since a complementary combustion takes place in the secondary fluidized layer without affecting detrimentally the separation of ashes of the combustible. Flue dust enriched by ashes by combustion in the secondary furnace is transformed into clinkers by being reinjected into the primary furnace at a high temperature. If desirable, an increase in the quantity of the flue dust emitted by the primary furnace can take place by increasing the ascending speed of the gases of the primary furnace and if needed additional granulated fuel may be added to the secondary furnace.

The heat exchange surfaces of the steam generator of the present invention, namely, the entirety of the radiant and convection surfaces of the primary furnace and the heat exchange surfaces in the fluidized layer for the reheating of water, vaporization and superheating, are substantially smaller than those of a boiler having the same output and characteristic features and provided with a primary furnace of the same type but wherein the transmission of heat is realized simply by radiation and convection and without the use of a secondary furnace with fluidized layers at a low temperature. The total heat exchange surfaces of a superheated steam generator of the present invention as compared to those of a prior art generator have a ratio of 1 to 5, or more. On the other hand, the sections of the base of the furnaces of these generators have a ratio of 1 to 2 or more.

These reductions in the section of the base of the combustion chamber and of the surfaces of thermic heat exchange facilitate the construction of compact pressurized generators which can be entirely shop fabricated, as well as the provision of outdoor installations.

It is now possible to supply the generator with a solid fuel graded at 0.20 mm. or even 0.30 mm. or less without it being necessary to break up the particles more or less finely, as is the case in prior art methods of combustion within a fluidized layer at a low temperature.

The separation and the elimination of ashes of the fuel in the form of clinkers or slag substantially free of carbon are attained by the present invention.

The fuel supply of the postcombustion furnace and its ignition do not provide any difficulties any more and do not require any special material. There is no more danger of extinction since this furnace is above the primary furnace.

The postcombustion and the calorific recovery in one or several fluidized layers are particularly suitable for the decontamination of combustion gases containing polluting substances, such as sulphurous or sulphuric acids or nitric acids and substances detrimental to the maintenance of calorific exchange surfaces, such as vanadium oxide.

The thermal efficiency of the generator of the present invention is a maximum due to the small calorific loss in the outer surfaces which have the minimal dimensions; also due to the small portion of effective gas heat evacuated by the stack the composition of which is quasi stoichiochemical; and also due to the very small portion of the combustible contained in the ash which is recovered as clinkers or slag.

It is apparent that the described example is capable of other variations and modifications within the scope of the present invention. All such variations and modifications are to be included within the scope of the present invention.

What is claimed is:

1. A combustion process, comprising combusting in a primary furnace operating at a sufficiently high temperature at least a portion of combustible smalls while separating and removing corresponding smelted ash in the form of clinkers or slag, thereafter combusting in a secondary furnace operating at a comparatively low temperature, ash-like carbon flue dust particles carried by gases ascending from the primary furnace while maintaining in a fluidized state in said secondary furnace at least one layer of incombustible granulated solid refractory substances and while providing in said layer a surface heat exchange which maintains a temperature sufficiently low to avoid all scorification in said layer but sufficiently high for the combustion of the particles carried by said gases, reintroducing at least a portion of the postcombusted residue of the flue dust ash-like carbon particles thus enriched with ash which is removed from gas into the primary furnace, subjecting it there to scorification and removing it in the form of clinkers or slag.

2. A combustion process in accordance with claim 1, wherein granulated fuel is added with air into the secondary furnace as a complementary fuel to the ash-like carbon flue dust ascending with the gas from the primary furnace.

3. A combustion process in accordance with claim 1, comprising subjecting combustion gases issuing from said different location to a surface heat recovering exchange within at least one layer of incombustible granulated solid refractory substances while maintaining a temperature which is lower than the fusion temperature of the ash contained in said gases.

4. A combustion process, comprising combusting in a primary furnace operating at a sufficiently high temperature, at least a portion of combustible smalls while separating and removing corresponding smelted ash in the form of clinkers or slag; thereafter combusting in a secondary furnace, operating at a comparatively low temperature, ash-like carbon flue dust particles carried by gases ascending from the primary furnace while maintaining in a fluidized state in said secondary furnace at least one layer of incombustible granulated solid refractory substances and while providing in said layer a surface heat exchange which maintains a temperature sufficiently low to avoid all scorification in said layer but sufficiently high for the combustion of particles carried by said gases, subjecting combustion gas issuing from said secondary furnace to a surface heat recovering exchange within at least one layer of incombustible granulated solid refractory substances, while maintaining a temperature which is lower than the fusion temperature of the ash contained in said gases, the temperature of the fluidized layer being regulated by varying the speed of circulation of a reheating fluid engaging the surface of the heat exchange, reintroducing at least a portion of the postcombusted residue of the flue dust ash-like carbon particles thus enriched with ash which is removed from gas into the primary furnace, subjecting it there to scorification and removing it in the form of clinkers or slag.

5. A combustion process, comprising combusting in a primary furnace operating at a sufficiently high temperature, at least a portion of combustible smalls while separating and removing corresponding smelted ash in the form of clinkers or slag; thereafter combusting in a secondary furnace, operating at a comparatively low temperature, ash-like carbon flue dust particles carried by gases ascending from the primary furnace while maintaining in a fluidized state in said secondary furnace at least one layer of combustible granulated solid refractory substances and while providing in said layer a surface heat exchange which maintains a temperature sufficiently low to avoid all scorification in said layer but sufficiently high for the combustion of particles carried by said gases, subjecting combustion gas issuing from said secondary furnace to a surface heat recovering exchange within at least one layer of incombustible granulated solid refractory substances, while maintaining a temperature which is lower than the fusion temperature of the ash contained in said gases, the temperature of the fluidized layer being regulated by varying its thickness and thereby varying its area of contact with the surface of the heat exchange, reintroducing at least a portion of the postcombusted residue of the flue dust ash-like carbon particles thus enriched with ash which is removed from gas into the primary furnace, subjecting it there to scorification and removing it in the form of clinkers or slag.

6. A steam generator, comprising a primary furnace adapted to be maintained at a high temperature, means removing ash from said furnace in the form of clinkers or slag, a secondary furnace of postcombustion receiving gases and ash-like particles from said primary furnace, at least one fluidized layer of incombustible granulated solid refractory substances located in said secondary furnace, means having calorific exchange surfaces located in said layer, and means reintroducing at least some of ash-like particles produced in said secondary furnace into said primary furnace for their removal in the form of clinkers or slag.

7. A steam generator in accordance with claim 6, wherein said fluidized layer consists of incombustible granules of ashes resulting from the fuel of the generator.

8. A steam generator in accordance with claim 6, wherein said fluidized layer consists of incombustible refractory materials having a floating capacity in the fluidized layer which is substantially less than that of flue dust contained in the gases passing through the fluidized layer.

9. A steam generator in accordance with claim 6, wherein said fluidized layer consists of substances at least neutralizing undersirable chemical substances contained in the gases passing through the fluidized layer.

10. A steam generator in accordance with claim 6, wherein said primary furnace comprises means for the introduction of combustible smalls, means injecting primary air and means introducing secondary air, as well as means for the introduction of recycled combustion gas, the means reintroducing at least some of ash-like particles produced in said secondary furnace into said primary furnace including vaporizing radiant screens, the steam generator further comprising a heat exchanger recovering the effective heat of gases and ash-like particles after combustion and a device for collecting ashes.

References Cited

UNITED STATES PATENTS

| | | | |
|---|---|---|---|
| 1,680,183 | 8/1928 | Szikla et al. | 110—28 |
| 2,730,971 | 1/1956 | Birkner | 110—49 XR |
| 2,866,696 | 12/1958 | Godel | 110—28 XR |
| 3,119,379 | 1/1964 | Sweeney | 110—28 |
| 2,884,373 | 4/1959 | Bailey. | |

FOREIGN PATENTS

| | | |
|---|---|---|
| 531,658 | 9/1954 | Belgium. |
| 914,034 | 6/1946 | France. |
| 1,058,527 | 11/1953 | France. |
| 639,120 | 6/1950 | Great Britain. |

KENNETH W. SPRAGUE, *Primary Examiner.*

U.S. Cl. X.R.

110—28